(12) United States Patent
Alulis et al.

(10) Patent No.: US 7,845,077 B1
(45) Date of Patent: Dec. 7, 2010

(54) METHOD OF MANUFACTURING A SIZING RING

(76) Inventors: Eric B. Alulis, 315 New St., #211, Philadelphia, PA (US) 19106; Gena Alulis, 60 Garland Rd., Valley Forge, PA (US) 19460; Paul F. Alulis, 60 Garland Rd., Valley Forge, PA (US) 19460

( * ) Notice: Subject to any disclaimer, the term of this patent is extended or adjusted under 35 U.S.C. 154(b) by 406 days.

(21) Appl. No.: 11/924,384

(22) Filed: Oct. 25, 2007

Related U.S. Application Data

(60) Provisional application No. 60/862,887, filed on Oct. 25, 2006.

(51) Int. Cl.
 *A44C 9/00* (2006.01)
(52) U.S. Cl. .................. 29/896.412; 264/296; 33/514.1
(58) Field of Classification Search ................ 428/66.6; 264/296, 297.2, 320; 29/896.412; 63/15.7, 63/15.45, 15.5, 15.1, 7, 3.1, 11; 70/459, 70/458; 24/598.2, 28; 33/514.1, 555.1
See application file for complete search history.

(56) References Cited

U.S. PATENT DOCUMENTS

| | | | |
|---|---|---|---|
| 2,449,181 A | * | 9/1948 | Smiley ........................ 40/633 |
| 3,548,506 A | * | 12/1970 | Harrington .................. 33/555.2 |
| 6,279,244 B1 | * | 8/2001 | Kelley ........................ 33/514.1 |
| 6,701,583 B1 | * | 3/2004 | McCullough ............. 24/116 R |

* cited by examiner

*Primary Examiner*—Alexander Thomas
(74) *Attorney, Agent, or Firm*—Garcia-Zamor IP Law; Ruy M. Garcia-Zamor

(57) ABSTRACT

A method of manufacturing a sizing ring adapted to accurately fit an individual for a recloseable ring. The method includes: providing a generally arcuate member and having first and second ends; forming a segment of reduced cross sectional area along the generally arcuate member to form a living hinge therein and to define first and second shank portions; and configuring the first and second ends to form a connector such that the sizing ring is a one piece polymer member configured for movement between an open position, in which the sizing ring is adapted to be positioned over a portion of an appendage without sliding over a length of the appendage, and a closed position, in which the sizing ring is adapted to form a band around the appendage and has an inner surface that is generally circular to correspond to an associated ring size.

10 Claims, 7 Drawing Sheets

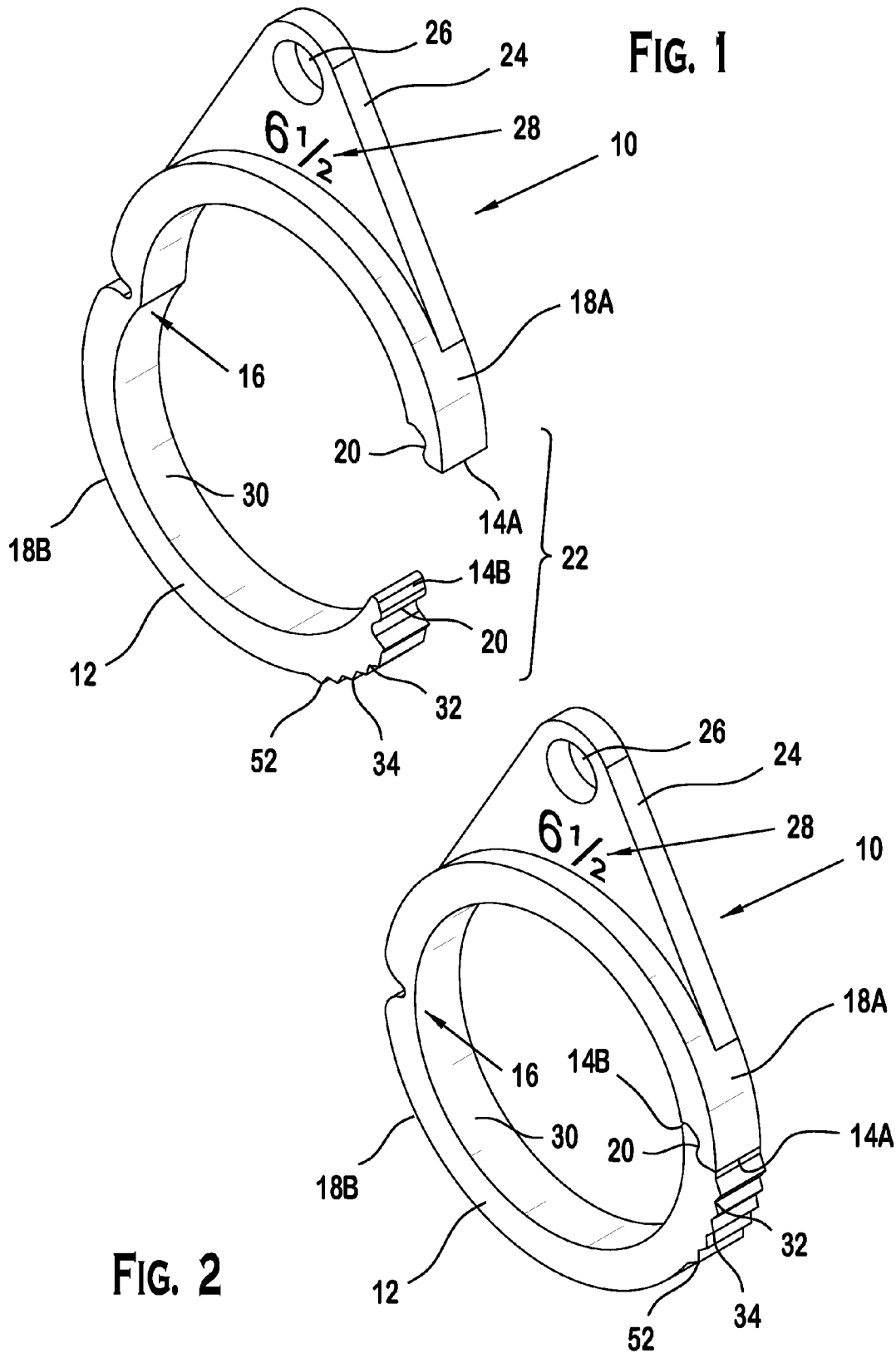

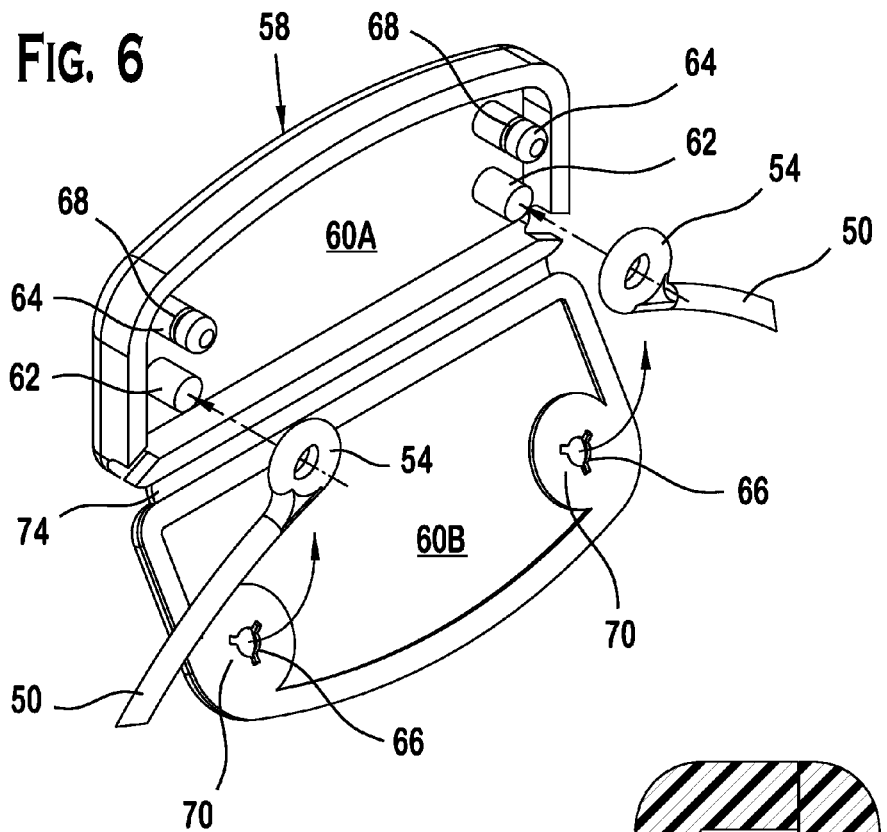
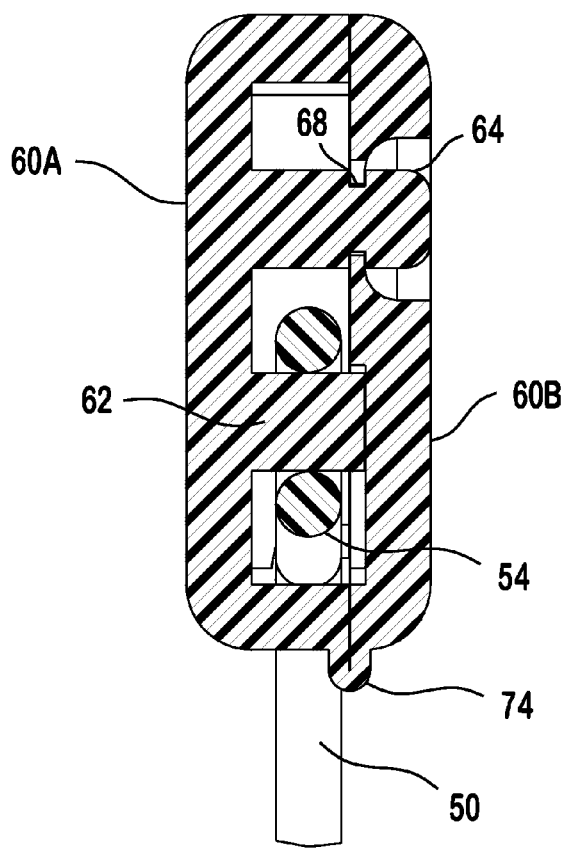

METHOD OF MANUFACTURING A SIZING RING

CROSS REFERENCE TO RELATED APPLICATION

This application claims priority to and benefit of U.S. Provisional Patent Application 60/862,887, filed on Oct. 25, 2006, entitled "Ring Sizing Apparatus and Method", which is hereby incorporated by reference herein as if fully set forth in its entirety.

BACKGROUND

The present invention is generally directed to a method of fitting rings and, more specifically, provides a sizing ring, kit, and/or method for fitting an individual for a recloseable ring.

To properly fit a recloseable ring to an individual it is necessary to gauge the individual finger/toe at its base (which is usually where rings are worn). The base of the finger/toe is normally smaller than the adjacent knuckle/toe joint.

Conventionally, jewelry professionals use standard ring sizing gauges that mimic a standard ring shank and allows one to determine the size of a ring that will slide over a knuckle. However, this solution is problematic for recloseable rings since sizing a ring to the knuckle, as opposed to the base of the finger, results in an improperly, loose fit.

It may be advantageous to provide a sizing ring, kit, and/or method for fitting an individual for a recloseable ring that preferably accurately measures the base of an appendage; preferably is easy to use; and that preferably can be manufactured in an efficient manner.

SUMMARY

Briefly speaking, one embodiment of the present invention is directed to a method of manufacturing a sizing ring adapted to accurately fit an individual for a recloseable ring. The method includes: providing a generally arcuate member formed of polymer and having first and second ends; forming a segment of reduced cross sectional area along the generally arcuate member to form a living hinge therein and to define first and second shank portions; and configuring the first and second ends to form a connector such that the sizing ring is a one piece polymer member configured for movement between an open position, in which the sizing ring is adapted to be positioned over a portion of an appendage without sliding over a length of the appendage, and a closed position, in which the sizing ring is adapted to form a band around the appendage and has an inner surface that is generally circular to correspond to an associated ring size.

In another embodiment, the present invention is directed to a sizing ring including a generally arcuate member formed of polymer and having first and second ends. The generally arcuate member includes a living hinge therein to define first and second shank portions. The first and second ends are configured to form a connector such that the sizing ring is a one piece polymer member configured for movement between an open position, in which the sizing ring is adapted to be positioned over a portion of an appendage without sliding over a length of the appendage, and a closed position, in which the sizing ring is adapted to form a band around the appendage and has an inner surface that is generally circular to correspond to an associated ring size.

In another embodiment, the present invention is directed to a method of manufacturing a kit for accurately fitting an individual for a recloseable ring. The method includes providing a plurality of sizing rings corresponding to different associated ring sizes. Each of the plurality of rings includes first and second shank portions each having hinge and connector ends. The hinge end of the first and second shank portions are pivotally connected. A first shank portion includes a cavity proximate to the connector end. The second shank portion includes a latch pivotably mounted thereon. The latch is rotateable into the cavity to secure the first and second shank portions in a closed position. Each of the plurality of sizing rings is moveable between an open position, in which the sizing ring is adapted to be positioned over a portion of an appendage without sliding over a length of the appendage, and a closed position, in which the sizing ring is adapted to form a band around the appendage and has an inner surface that is generally circular to correspond to an associated ring size.

A method of manufacturing a kit for accurately fitting an individual for a recloseable ring. The method includes providing a plurality of sizing rings corresponding to different associated ring sizes. Each of the plurality of rings includes first and second shank portions each having hinge and connector ends. The hinge end of the first and second shank portions are pivotally connected. The connector ends are configured to detachably secure the first and second shank portions in the closed position. Each of the plurality of sizing rings is moveable between an open position, in which the sizing ring is adapted to be positioned over a portion of an appendage without sliding over a length of the appendage, and a closed position, in which the sizing ring is adapted to form a band around the appendage and has an inner surface that is generally circular to correspond to an associated ring size. The method also includes assembling each of the plurality of sizing rings on a common element.

BRIEF DESCRIPTION OF THE DRAWINGS

The foregoing summary, as well as the following detailed description of the preferred embodiments of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings:

FIG. 1 is a perspective view of a first preferred embodiment of a sizing ring according to the present invention; the sizing ring is shown in an open position (in which the sizing ring is adapted to be positioned over a portion of an appendage without sliding over the length of the appendage) and is preferably formed by a single piece of polymer having first and second ends which form a connector; The sizing ring preferably includes a living hinge that defines first and second shank portions; The sizing ring can be made of any suitable material without departing from the scope of the present invention;

FIG. 2 is a perspective view of the sizing ring of FIG. 1 illustrating the sizing ring in the closed position (in which the sizing ring is adapted to form a band around the appendage) in which an inner surface thereof is generally circular to correspond to an associated ring size; An anchor may be positioned on the first shank portion and may include indicia thereon indicating the associated ring size for the sizing ring; An abutment may be located on the second shank portion to provide a tab that can be depressed to disengage the first and second ends when the sizing ring is in the closed position;

FIG. 6 is a perspective view of a preferred closure element that may be used to secure sizing rings to the common element; The closure element preferably includes first and second panels that are joined via a second living hinge and may be configured to fold onto itself to secure the two common element ends therein and to close the gap; The closure element preferably includes a second connector to secure at least one of the two ends of the common element therein when the closure element is in the folded, closed position; The closure element preferably uses a combination snap fit mounting post and mating recess to secure the first and second panels in the folded, closed position;

FIG. 7 is a cross-sectional view of the closure element of FIG. 5 as taken along the line 7-7 of FIG. 5 and illustrates the preferred securing of an end of the common element to a connector; The securing of a surrounding layer of material proximate the mating recess in a groove in the snap fit mounting post is also illustrated;

DETAILED DESCRIPTION OF THE PREFERRED EMBODIMENTS

Figure 3:
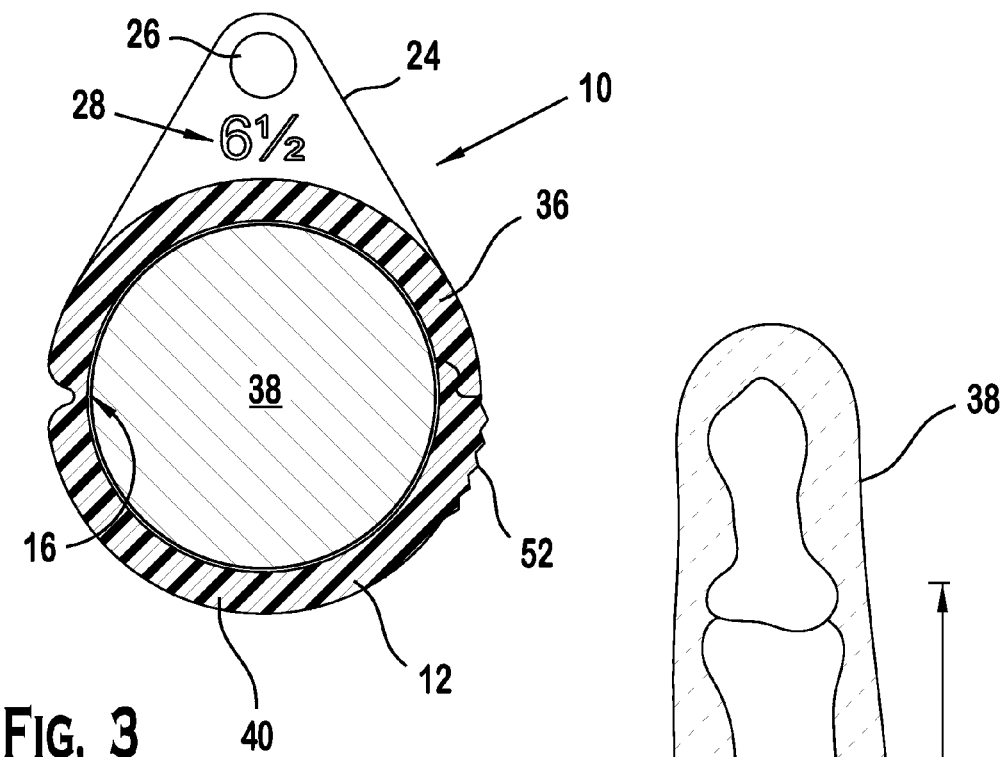
FIG. 3 is a cross-sectional view of the sizing ring of FIG. 4 as taken along the line 3-3 of FIG. 4 and illustrates that the sizing ring is preferably, but not necessarily, made of at least one polymer; the sizing ring forming a band around a finger is also illustrated.

Certain terminology is used in the following description for convenience only and is not limiting. The words "right," "left," "top," and "bottom" designate directions in the drawings to which reference is made. The words "inwardly" and "outwardly" refer to directions toward and away from, respectively, the geometric center of the sizing ring and designated parts thereof. The term "appendage", as used in the claims and corresponding portions of the specification, means "any one of a finger, toe, tie, or the like". The language "at least one of 'A', 'B', and 'C'," as used in the claims and in corresponding portions of the specification, means "any group having at least one 'A'; or any group having at least one 'B'; or any group having at least one 'C';—and does require that a group have at least one of each of 'A', 'B', and 'C'." Additionally, the words "a" and "one" are defined as including one or more of the referenced item unless specifically stated otherwise. The terminology includes the words above specifically mentioned, derivatives thereof, and words of similar import.

Referring to FIGS. 1-11, wherein like numerals indicate like elements throughout, there are shown preferred embodiments of sizing rings 10 and related kits according to the present invention. The present invention provides tools for accurately sizing an individual for a recloseable ring. Additionally, the present invention preferably provides a method of manufacturing sizing rings and/or kits that are preferably efficient to make and lightweight to form an easy to ship product.

Multiple preferred methods of the present invention will be described below (alone or in combination with various embodiments of the sizing ring 10). The steps of the methods of the present invention can be performed in any order, omitted, or combined without departing from the scope of the present invention. As such, optional or required steps described in conjunction with one method can also be used with another method or omitted altogether. Additionally, unless otherwise stated, similar functions described in conjunction with one method preferably, but not necessarily, operate in a generally similar manner to that described elsewhere in this application.

Referring to FIGS. 1-3, a method of manufacturing a sizing ring 10 adapted to accurately fit an individual for a recloseable ring preferably includes providing a generally arcuate member 12 having first and second ends 14A, 14B. The first and second ends 14A, 14B may form a connector 22 and can include interlocking members 20.

The arcuate member 12 is preferably formed of a suitable polymer 40, such as glass filled polypropylene or the like. However, those of ordinary skill in the art will appreciate from this disclosure that any suitable materials can be used to form the sizing ring 10 without departing from the scope of the present invention. A segment of reduced cross sectional area along the generally arcuate member 12 may form a living hinge 16 and define first and second shank portions 18A, 18B.

The shank portions 18A, 18B preferably generally form ring halves. An anchor 24 can be located on the first shank portion 18A for securing the sizing ring 10 on a common element 50 (further described below). The anchor 24 preferably has an upper side shaped like a triangle with a concave bottom side. A bore 26 may extend through the anchor 24.

Indicia 26 may be located on the anchor 24, or elsewhere on the sizing ring 10, that corresponds to an associated ring size.

An abutment 32 may be located on the second shank portion 18B proximate to the second end 14B to provide a tab 52 that can be depressed to disconnect the first and second ends 14A, 14B when the sizing ring 10 is in the closed position (as shown in FIG. 2). It is preferred that the abutment 32 include a saw-tooth profile edge 34 to facilitate tactile manipulation thereof. While a particular connector 22 has been described above, those of ordinary skill in the art will appreciate from the above disclosure that any suitable connector can be used without departing from the scope of the present invention.

Referring to FIGS. 1 and 2, the first and second ends 14A, 14B are preferably configured to form a connector 22 such that the sizing ring 10 is preferably a one piece polymer member 40 configured for movement between an open position (shown in FIG. 1), in which the sizing ring 10 is adapted to be positioned over a portion of an appendage 38 without sliding over a length 42 of the appendage 38 (shown in FIG. 4), and a closed position (shown in FIGS. 2 and 3), in which the sizing ring 10 is adapted to form a band 36 around the appendage 38 and has an inner surface 30 that is generally circular to correspond to an associated ring size.

Figure 4:
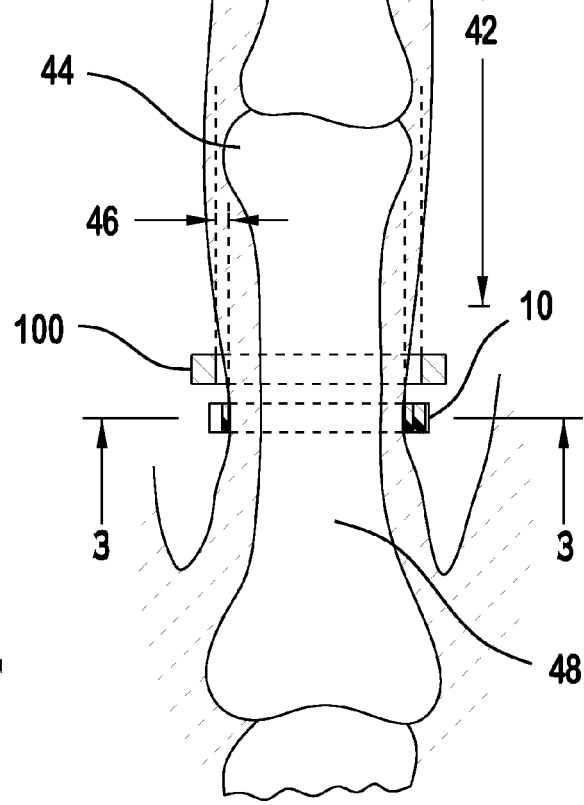
FIG. 4 illustrates the sizing ring of the present invention on a finger and also illustrates a prior art sizing ring on the finger; A radial distance, as measured from the longitudinal axis of the finger, between the inner surface of the sizing ring of the present invention and an inner surface of a prior art sizing ring is shown. The less precise fit of the prior art sizing ring is due to the necessity of the prior art sizing ring being able to slide along the length of the finger and over a knuckle thereof; Accordingly, a recloseable ring fitted to a person using a prior art sizing ring would fit improperly and be overly loose.

Referring to FIG. 4, a prior art sizing ring 100 must be large enough to fit over a knuckle 44 and thus is too large for the base of the finger 38 where the finger bone 48 is narrower. The sizing ring 10 of the present invention is able to precisely fit over the base of the finger 38 for a comfortable secure fit. The error distance 46, as measured radially to the longitudinal axis of the finger 38, between the inner surface 30 of the sizing ring 10 and the inner surface of the prior art sizing ring is the cause of the lack of proper fitting resulting from using prior art sizing rings 100.

Figure 5:
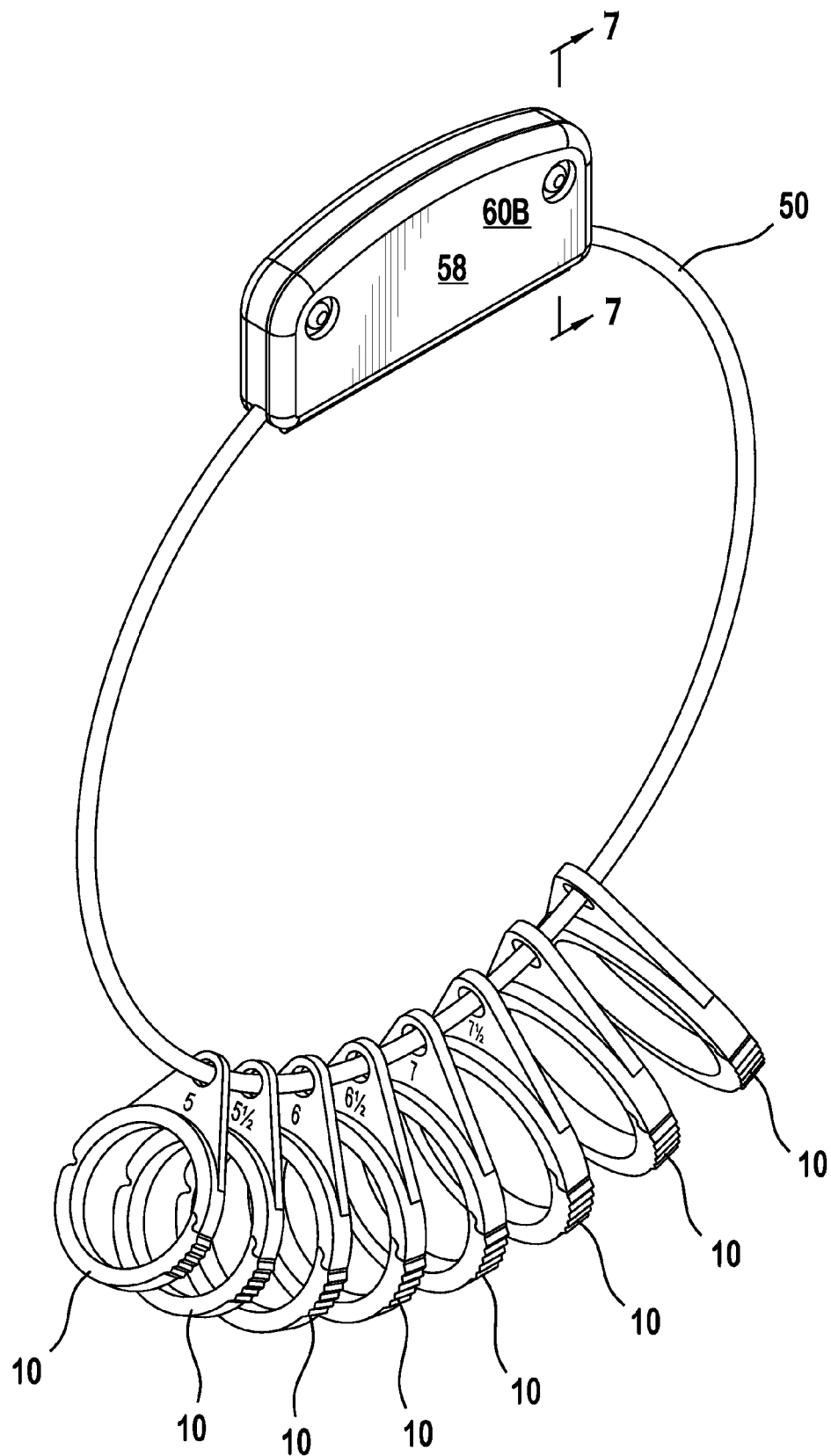
FIG. 5 is a perspective view of a kit of sizing rings according to the present invention illustrating the sizing rings on a common element which is preferably a common ring; The common element can be a chain, rope, rod, wire, or the like without departing from the scope of the present invention; the common ring preferably has two ends that form a gap (shown in FIG. 6); The kit preferably, but not necessarily, includes sizing rings for measuring an individual's ring size in half ring size increments between ring size two and ring size eleven and a half; However, those of ordinary skill in the art will appreciate from this disclosure that the range of ring sizes and the size increments can be varied without departing from the scope of the present invention.

Referring to FIGS. 5-7, the sizing ring 10 is preferably to a common element on which other sizing rings 10 are attached. The other sizing rings are of the same general construction as the sizing ring 10 but are sized to correspond to different associated ring sizes. It is preferred that the combination of the sizing ring 10 and the other sizing rings provides for measuring the individual's ring size in half ring size increments between ring size two (2) and ring size eleven and one half (11½). However, any size range and increment can be used without departing from the scope of the present invention.

The common element 50 is preferably a common ring, but may be any other suitable connection device, such as a rope, chain, etc. The common element 50 preferably has two ends 54 defining a gap 56 therein. As best shown in FIG. 6, the ends may include loops or be of any other suitable configuration.

A closure element 58 may be configured to fold onto itself and is configured to secure the two ends 54 therein to close the gap 56 and secure any sizing rings 10 to the common ring. The closure element 50 preferably has first and second panels 60A, 60B connected by a second living hinge 74. The first and second panels 60A, 60B may be detachably engageable when the closure element 58 is in a folded closed position (as shown in FIGS. 5 and 7). The panels can include a second connector 62 to secure at least one of the two ends 54 of the common ring 50 therein.

Referring again to FIG. 6, the closure element 58 preferably includes at least one snap fit connection post 64 and corresponding mating recess 66. Referring to FIG. 7, when the post 64 and recess 66 are engaged a surrounding layer 70 of material that defines the recess 66 is engaged with a groove 68 in the snap fit connection post 64.

Figure 8:
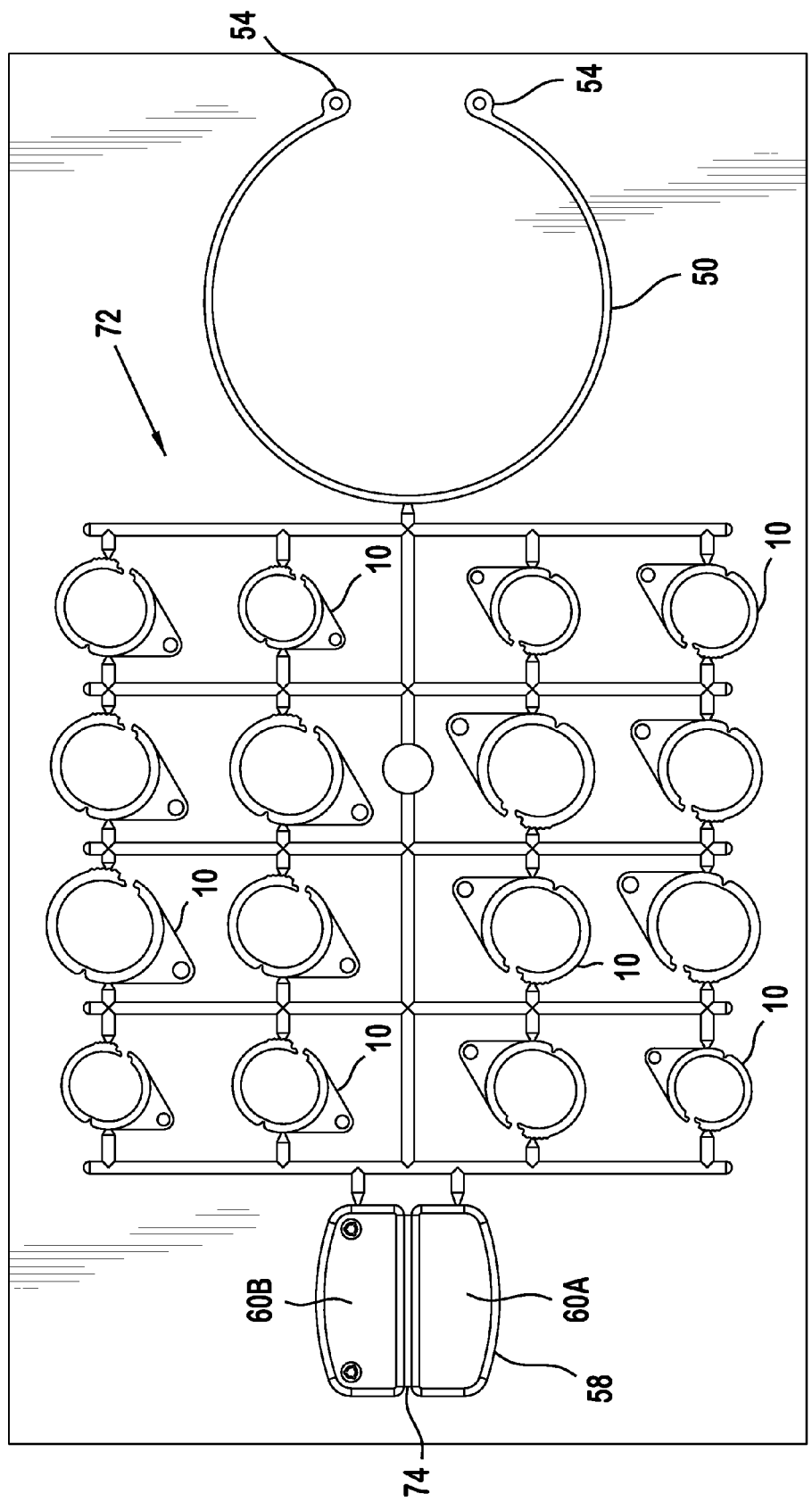
FIG. 8 is a top plan view of a set of sizing rings, a closure element, and a common element all preferably simultaneously produced via an injection molding process; However, those of ordinary skill in the art will appreciate from this disclosure that any other suitable manufacturing process can be used without departing from the scope of the present invention.

Referring to FIG. 8, an injection molded assembly 72 including the sizing rings 10, common element 50, and closure element 58 of the present invention is shown. It is preferred that the sizing rings 10 are formed using a single injection molding process. The common element 50 and/or the closure element 58 can also be made during the same process used to form the sizing rings 10. However, those of ordinary skill in the art will appreciate from this disclosure that any suitable manufacturing process can be used to make the sizing rings 10 of the present invention.

Figure 9:
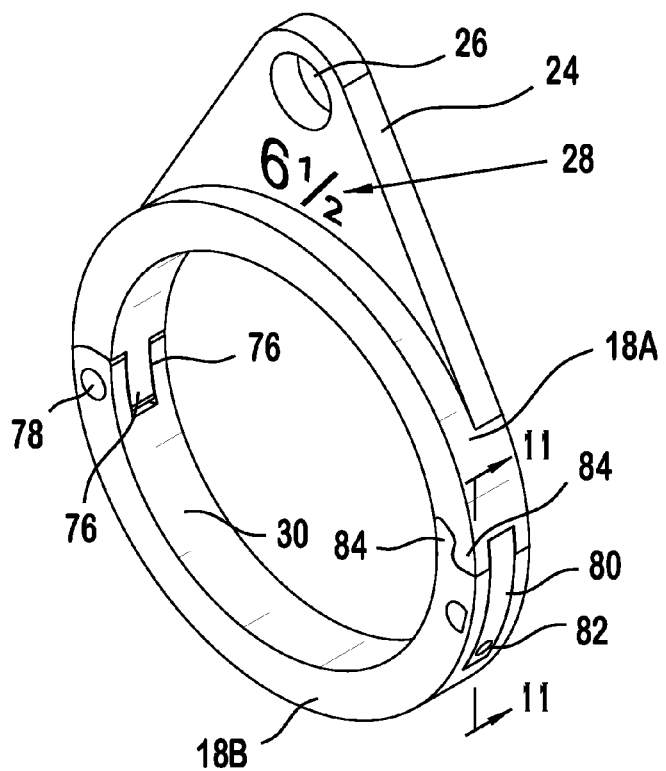
FIG. 9 is a perspective view of a second preferred embodiment of a sizing ring according to the present invention; the sizing ring is shown in the closed position (in which the sizing ring is adapted to form a band around the appendage) in which an inner surface thereof is generally circular to correspond to an associated ring size; An anchor may be positioned on the first shank portion and may include indicia thereon indicating the associated ring size for the sizing ring; The first and second shank portions are preferably hinged together and may be connected together via a latch.
Figure 10:
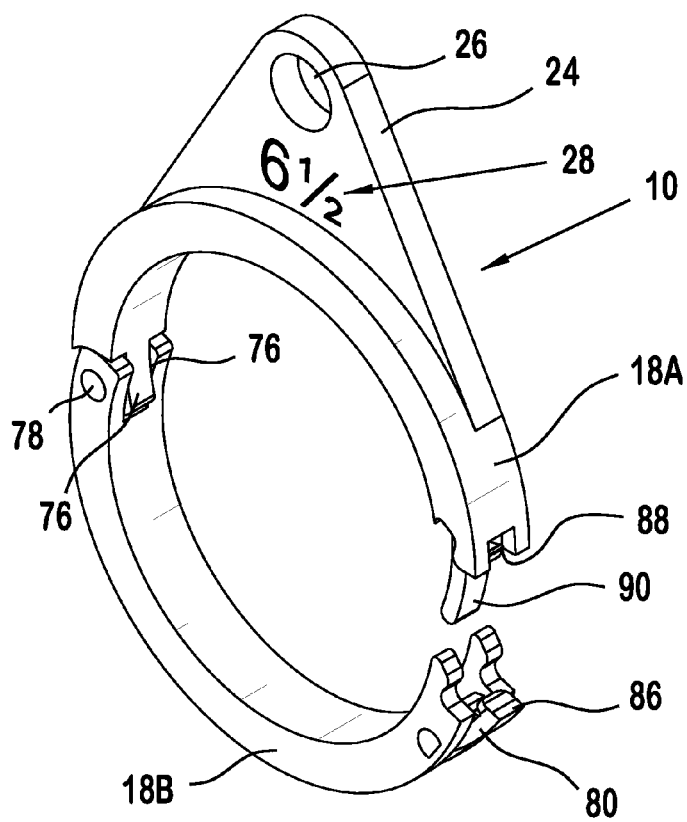
FIG. 10 is a perspective view of the sizing ring of FIG. 9 in an open position (in which the sizing ring is adapted to be positioned over a portion of an appendage without sliding over the length of the appendage)
Figure 11:
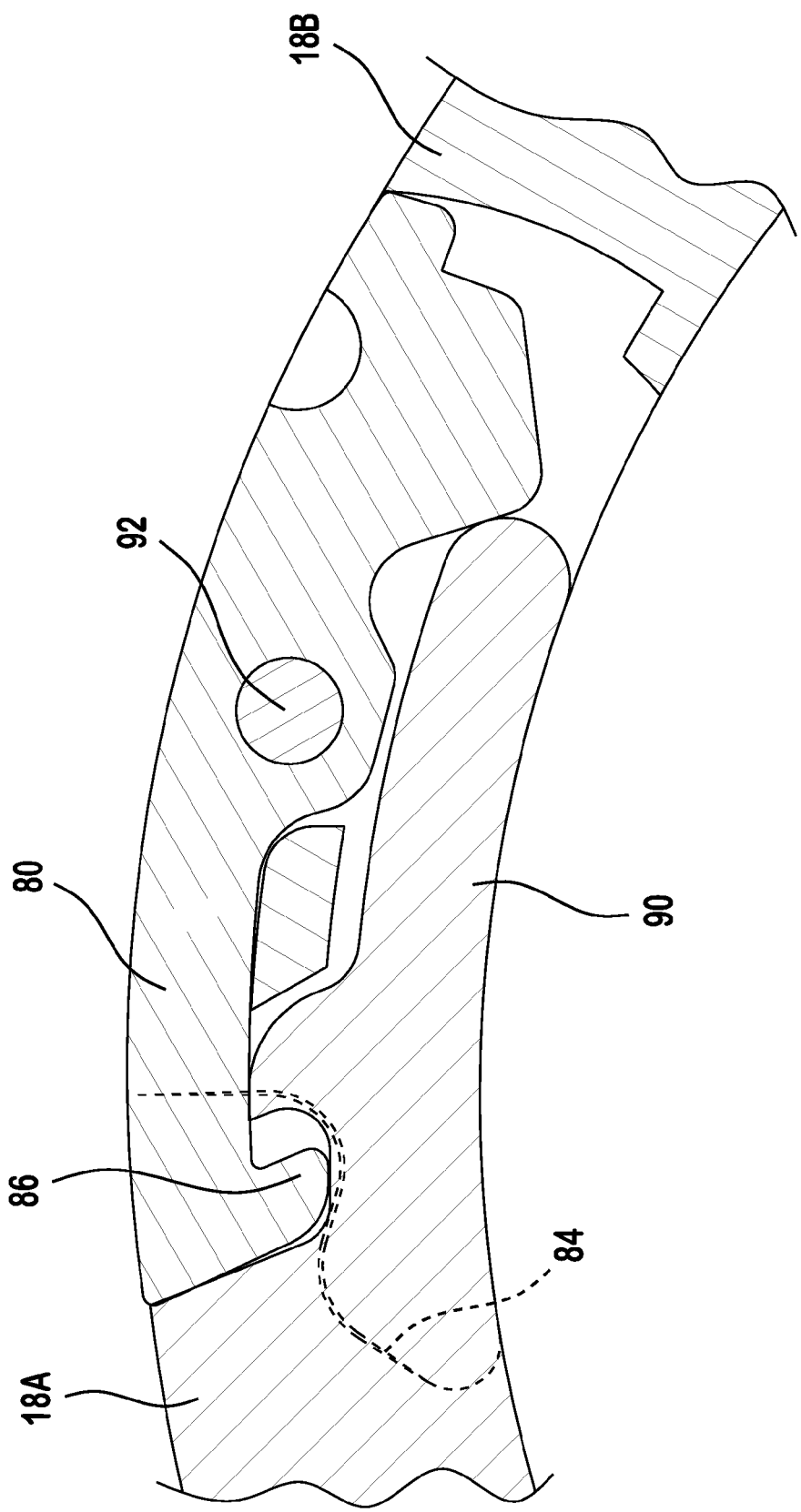
FIG. 11 is a cross-sectional view of the sizing ring of FIG. 9 as taken along the line 11-11 of FIG. 9 and illustrates the seating of the latch within a cavity to secure the first and second shank portions together.

Referring to FIGS. 9-11, a second preferred method of manufacturing a kit for accurately fitting an individual for a recloseable ring includes providing a plurality of sizing rings 10 corresponding to different associated ring sizes. It is preferred that each of the sizing rings 10 include first and second shank portions 18A, 18B each having a hinge end 76 (which may be connected via a pin 78) and a connector end 84. The first shank portion 18A may include a cavity 88 proximate to the connector end 84. The second shank portion 18B may include a latch 80 pivotably mounted thereon. The latch 80 is preferably rotateable into the cavity 88 to secure the first and second shank portions 18A, 18B in a closed position (shown in FIG. 9).

Each of the plurality of sizing rings 10 is preferably moveable between an open position (shown in FIG. 10), in which the sizing ring is adapted to be positioned over a portion of an appendage 38 without sliding over a length 42 of the appendage 38, and a closed position (shown in FIG. 9), in which the sizing ring 10 is adapted to form a band 38 around the appendage 38 and has an inner surface 30 that is generally circular to correspond to an associated ring size.

The latch 80 may rotate about pivot 92 and preferably includes a latch head 86 that is received in the cavity 88. A detent 82 can be located on the latch to facilitate rotating the latch 80 into an open position. A tongue 90 may be used to facilitate engagement of the two connector ends 84.

The method may include assembling each of the plurality of sizing rings 10 on a common element 50. The plurality of sizing rings 10 may be formed of at least one of gold, silver, and platinum and secured to a common element to form a ring sizing kit. However, those of ordinary skill in the art will appreciate from this disclosure that any other suitable material can be used to form the sizing rings 10 without departing from the scope of the present invention. Additionally, although a preferred construction of the second preferred embodiment of the sizing ring 10 has been shown, any suitable construction can be used without departing from the scope of the present invention.

It is recognized by those skilled in the art that changes may be made to the above described methods, kits and/or sizing rings 10 without departing from the broad inventive concept thereof. It is understood, therefore, that this invention is not limited to the particular embodiments disclosed, but is intended cover all modifications which are within the spirit and scope of the invention as defined by the above specification, the appended claims and/or shown in the attached drawings.

What is claimed is:

1. A method of manufacturing a sizing ring adapted to accurately fit an individual for a recloseable ring, comprising the steps of:

providing a generally arcuate member formed of polymer and having first and second ends;

forming a segment of reduced cross sectional area along the generally arcuate member to form a living hinge therein and to define first and second shank portions;

configuring the first and second ends to form a connector such that the sizing ring is a one piece polymer member configured for movement between an open position, in which the sizing ring is adapted to be positioned over a portion of an appendage without sliding over a length of the appendage, and a closed position, in which the sizing ring is adapted to form a band around the appendage and has an inner surface that is generally circular to correspond to an associated ring size;

locating an anchor on the first shank portion for securing the sizing ring on a common element; and locating an abutment on the second shank portion proximate to the second end to provide a tab that can be depressed to disconnect the first and second ends when the sizing ring is in the closed position.

2. The method of claim 1, wherein the step of locating further comprises the anchor including indicia corresponding to the associated ring size.

3. The method of claim 1, further comprising attaching the sizing ring to a common element on which other sizing rings are attached, the other sizing rings being of the same construction as the sizing ring but are sized to correspond to different associated ring sizes.

4. The method of claim 3, wherein the step of attaching further comprises the common element being a common ring with two ends defining a gap therein, a closure element is configured to fold onto itself and is configured to secure the two ends therein to close the gap and secure any sizing rings attached to the common ring thereto.

5. The method of claim 4, wherein the step of attaching further comprises the closure element having first and second panels connected by a second living hinge and that are detachably engageable when the closure element is in a folded, closed position, the panels including a second connector to secure at least one of the two ends of the common ring therein when the closure element is in the folded, closed position.

6. The method of claim 3, wherein the sizing ring and the other sizing rings are simultaneously formed in a single injection molding process.

7. The method of claim 3, wherein the sizing ring, the other sizing rings, and the closure element are simultaneously formed in a single injection molding process.

8. The method of claim 3, wherein the sizing ring, the other sizing rings, the closure element, and the common element are simultaneously formed in a single injection molding process.

9. The method of claim 1, further comprising locating the sizing ring with other sizing rings to form a set, the other sizing rings being of the same construction as the sizing ring but are sized to correspond to different associated ring sizes so that the combination of the sizing ring and the other sizing rings provides for measuring the individual's ring size in half ring size increments between ring size two (2) and ring size eleven and one half (11½).

10. The method of claim 1, wherein the step of providing further comprises the generally arcuate member being formed of glass filled polypropylene.

* * * * *